(No Model.)
E. MIGNAULT & G. A. PRICHARD.
CONVERTIBLE DUST PAN.
No. 374,988. Patented Dec. 20, 1887.
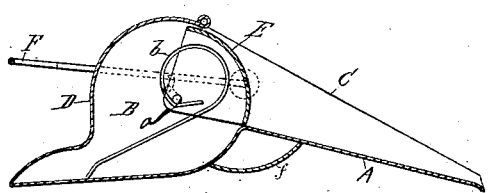
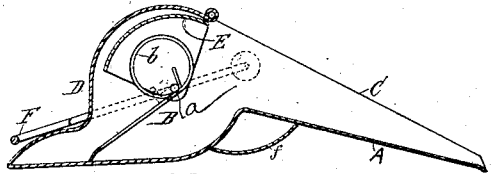
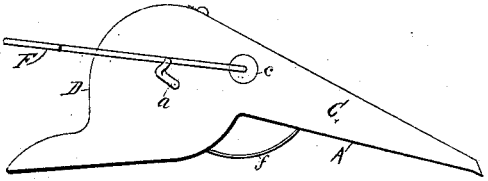
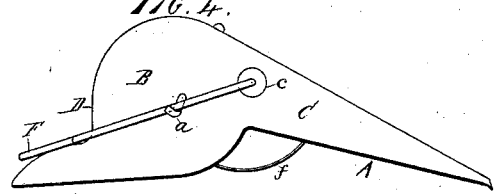
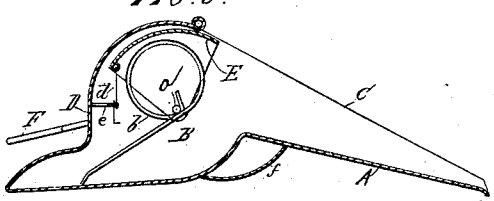
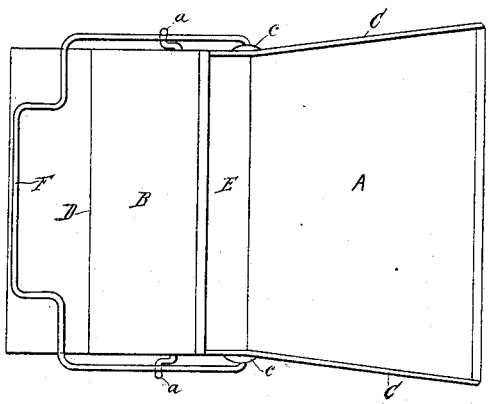
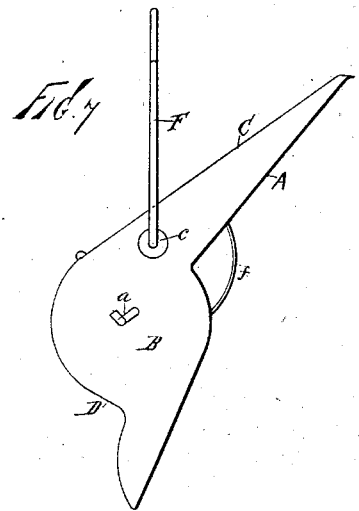
Witnesses:
John Buckler
L. H. Osgood
Eusebe Mignault and
George A. Prichard,
Inventors.
By Worth Osgood
Attorney.

UNITED STATES PATENT OFFICE.

EUSEBE MIGNAULT AND GEORGE A. PRICHARD, OF NEW YORK, N. Y.

CONVERTIBLE DUST-PAN.

SPECIFICATION forming part of Letters Patent No. 374,988, dated December 20, 1887.

Application filed April 9, 1887. Serial No. 234,217. (No model.)

*To all whom it may concern:*

Be it known that we, EUSEBE MIGNAULT and GEORGE A. PRICHARD, of New York city, county and State of New York, have jointly invented certain new and useful Improvements in Convertible Dust-Pans, of which the following is a full, clear, and exact description, reference being had to the accompanying drawings, and to the letters of reference marked thereon.

Our invention has relation to an improved household utensil chiefly designed for use as a dust-pan, but which is applicable to other uses and purposes, and which we denominate a "convertible dust-pan."

The object of our invention is to produce a simple, cheap, and convenient utensil which will possess all the advantages of the most approved forms of dust-pans, wherein the dust will be effectually and automatically inclosed, which will operate as a dust-carrier without danger of spilling the dust, which will embody conveniences and appliances for converting it into an animal-trap without adding materially to its cost and without in any way interfering with its other uses, and which will embody a convenient receptacle or holder for dust or other brushes or cloths. To accomplish all of this our improvements involve certain new and useful peculiarities of construction, relative arrangements or combinations of parts, and principles of operation, all of which will be herein first fully described, and then pointed out in the claims.

In the accompanying drawings, forming part of this specification, Figure 1 is a sectional elevation, and Fig. 2 a side elevation, showing the improved implement or utensil in a position as resting upon the floor with its lid or cover closed, and omitting the latch or catch by which the lid is set in opened position. Figs. 3 and 4 are views like Figs. 1 and 2, respectively, but shows the lid or cover opened as when ready to receive the dust or other matters which it is designed to collect. Fig. 5 is a sectional elevation showing the pan set ready to operate as an animal-trap. Fig. 6 is a top or plan view. Fig. 7 is a side elevation showing the position assumed by the implement and its handle or bail when being carried or when hung up.

In all these figures like letters of reference, wherever they occur, indicate corresponding parts.

A is the platen or inclined front piece of the utensil, upon which the dust or sweepings are gathered and directed back to the well or pocket B. The side pieces, C, are joined with the front piece, the bottom of the pocket, and the back piece, D, which latter may be made continuous, if desired. The back of the pocket is of general circular form.

E is the lid or cover, hinged within the side pieces, C, as upon the arms $a$, which extend to the exterior, and calculated to completely cover the front opening of the dust-pocket and to revolve beneath the top or back of the dust-pocket, as indicated in Figs. 3 and 5.

Within the pocket and on each side are light springs, as $b$, the free ends of which are connected with the arms or cranks $a$ in such manner that when the arms or cranks are revolved, and thus the cover opened, the springs $b$ will be wound, and when the cranks are released will force the cover back to its closed position and hold it there.

F is the bail, hinged or pivoted, as at $c\ c$, on each side of the implement and in advance of the center of gravity of the whole, so that when lifted by the handle the pocket or well will assume the position shown in Fig. 7. When the utensil is placed upon the floor and the handle released, it drops down and is supported by the arms or cranks $a$. Then when it is desired to open the pocket the handle is simply pressed down with the foot, causing the cranks to revolve, carrying the cover up against the action of the springs, and when the handle is again released the cover will be automatically returned to its closed position. The pan is thus capable of being carried about or placed away without danger of spilling its contents.

Upon the rear portion of the cover we place a hinged latch or trigger or bait-hook, as $d$, and upon the back of the pocket any simple form of catch, as $e$. By turning the cover back and setting the bait-hook, as indicated, the device is converted into a simple and efficient trap for rats or mice, &c., the springs closing the cover as soon as the hook is released. These additions in no way interfere with the operations of the device as a dust-pan, and their expense is little or nothing.

The device need not be supplied with the catch or latch, if so preferred. The upwardly-inclined platen or dust-guide forms an angle with the adjacent portion of the pocket, and this is made of sufficient extent to accommodate a brush or cloth, a receptacle or retainer for which is provided by use of a strip, $f$, secured to both parts, leaving the receptacle open at both ends.

The device thus constructed and arranged is found to admirably answer the purpose or object of the invention as previously set forth.

Having now fully described our invention, what we claim as new, and desire to secure by Letters Patent, is—

1. In a dust-pan, the combination, with the dust guide and pocket, of a hinged cover, springs and projecting arms or cranks connected with said cover, and a hinged bail, substantially as shown and described.

2. In a dust-pan, the combination, with the dust-pocket and hinged spring-actuated cover therefor, of the hook and catch, substantially as and for the purposes set forth.

3. In a dust-pan, the combination, with the dust guide and pocket, of a hinged cover, springs bearing on said cover, projecting arms or cranks connected with the cover, and a bail hinged in advance of the center of gravity and arranged to open the cover by bearing upon the cranks, substantially as shown and described.

4. In a dust-pan, the combination of the dust-pocket, having the spring-actuated hinged cover, the inclined dust-guide leading to and connected with said pocket, and the strip $f$, secured to the pocket and guide, forming a receptacle with open ends, substantially as shown and described.

In testimony that we claim the foregoing we have hereunto set our hands in the presence of two witnesses.

EUSEBE MIGNAULT.
GEORGE A. PRICHARD.

Witnesses:
JOHN BUCKLER,
WORTH OSGOOD.